United States Patent
Bonanno et al.

(10) Patent No.: US 7,873,818 B2
(45) Date of Patent: Jan. 18, 2011

(54) SYSTEM AND METHOD FOR SEARCH AREA CONFINED BRANCH PREDICTION

(75) Inventors: James J. Bonanno, Wappingers Falls, NY (US); Brian R. Prasky, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 12/035,654

(22) Filed: Feb. 22, 2008

(65) Prior Publication Data

US 2009/0217016 A1    Aug. 27, 2009

(51) Int. Cl.
G06F 9/00    (2006.01)

(52) U.S. Cl. .................................... 712/238
(58) Field of Classification Search .............. 712/238
See application file for complete search history.

(56) References Cited

U.S. PATENT DOCUMENTS

| | | | |
|---|---|---|---|
| 5,944,817 A | 8/1999 | Hoyt et al. | |
| 6,108,776 A | 8/2000 | Check et al. | |
| 6,247,122 B1 | 6/2001 | Henry et al. | |
| 6,263,427 B1 * | 7/2001 | Cummins et al. | 712/236 |
| 6,601,161 B2 | 7/2003 | Rappoport et al. | |
| 7,000,096 B1 * | 2/2006 | Sinharoy | 712/240 |
| 7,082,520 B2 | 7/2006 | Bonanno et al. | |
| 7,346,737 B2 * | 3/2008 | Lee | 711/125 |
| 2005/0204120 A1 | 9/2005 | Prasky et al. | |
| 2008/0148028 A1 * | 6/2008 | Grandou et al. | 712/238 |

OTHER PUBLICATIONS

Kim, Cheol H., Chung, Sung W., Jhon, Chu S. "A power-aware branch predictor by accessing the BTB selectively" J. Comput. Sci & Technol. Sep. 2005, vol. 20, No. 5, pp. 607-614.*
Baniasadi, Amirali, Moshovos, Andreas. "Instruction flow-based front-end throttling for power-aware high-performance processors" ISLPED'01: Proceedings of the 2001 International Symposium on Low Power Electronics and Design, Huntington Beach, CA, USA, Aug. 6-7, 2001.*
z/Architecture, Principles of Operation, Sixth Edition, Apr. 2007, Publication No. SA22-7832-05, copyright IBM Corp. 1990-2007, pp. 1-1218.
Daniel A. Jimenez et al., The Impact of Delay on the Design of Branch Predictors, Copyright 2000 IEEE, 10 pages.
Brad Calder et al., Fast & Accurate Instruction Fetch and Branch Prediction, Copyright 1994 IEEE, 10 pages.
Daniel A. Jimenez, Code Placement for Improving Dynamic Branch Prediction Accuracy, PLDI 2005, Copyright 2005 ACM, 10 pages.
Ravi Bhargava et al., Latency and Energy Aware Value Prediction for High-Frequency Processors, ICS 2002, Copyright 2002 ACM, 12 pages.

* cited by examiner

*Primary Examiner*—Jacob Petranek
(74) *Attorney, Agent, or Firm*—Cantor Colburn LLP; John Campbell

(57) ABSTRACT

A system and method for performing search area confined branch prediction in a processor are provided. The system includes a branch target buffer (BTB) to hold branch information for branch prediction, where the branch information includes a branch address. The system also includes search logic for searching the BTB to locate a branch address. The system additionally includes throttle logic to stop searching the BTB in response to reaching a predefined search limit.

14 Claims, 3 Drawing Sheets

SYSTEM AND METHOD FOR SEARCH AREA CONFINED BRANCH PREDICTION

BACKGROUND OF THE INVENTION

This invention relates generally to branch prediction in a computer system, and more particularly to search area limiting in a branch target buffer for branch prediction in a processor.

Computer programs frequently contain subroutines that are used to perform specific tasks within the programs. Such subroutines are used to enable the reuse of code in a program and reduce code duplication. When a program is executing as a stream of instructions in a microprocessor, subroutines are typically handled by a branch instruction in the instruction stream to the start of a subroutine. The processor then executes the instructions in the subroutine, and at its conclusion, the subroutine contains another branch instruction to return to the sequential instruction of its caller. Prior to the conclusion of the subroutine, the subroutine may call additional subroutines to perform the task at hand. Since subroutines are frequently used in computer programs, optimizing this sequence can boost the performance of a program.

Modern high performance microprocessors contain logic that maintains a direction history of recently encountered branch instructions known as a branch history table (BHT). Many processors also contain a branch target buffer (BTB), which stores branch address and target address bits associated with a given branch. This mechanism can be used to enhance the performance of executing subroutines by predicting in advance of instruction decoding, where within the instruction address stream a branch will be that calls a subroutine, and what the target of the branch will be. As such, a redirection penalty from the branch to the target can be reduced to the point of eliminating the penalty all together. The redirection penalty refers to a reduction in cycles per instruction (CPI) performance that can occur when a processing pipeline stalls to wait for a target address to be resolved. Upon prediction of the subroutine, the branch prediction will continue the search for the next branch beginning with the first instruction, the branch target of which called the subroutine, within the subroutine. As searching is performed, instruction fetching may be initiated to predicted locations of branch targets.

The typical use of a BTB is to record prior branches in a table. The table, upon being given an address, is searched sequentially for the next branch within the instruction address as per a prior occurrence. The BTB typically contains 3 portions of addressing. Given a 64-bit address as an example, bits 50:59 can be used to index a multiple set-associative table, and within the table, tags associated with bits 40:49 & 60:63 are stored. Given a 4-set associative BTB, 4 branches per address region 50:59 can be stored in the table. Tags associated with bits 40:49 can be used to confirm a branch per the index. Tags associated with bits 60:63 define where the branch is located in 16-byte regions. Upon an initial index into the BTB, a branch is searched per the 4 entries at the given index. If a branch is not found, the index is increment by 1 and a sequential line containing another 4 branch entries of the BTB is searched. This process continues until a branch is found or a reset condition restarts the branch prediction.

When a subroutine is called there is no guarantee that should a branch not be found/predicted within the given subroutine, that the BTB will not continue sequentially searching beyond the end of the subroutine. If the return branch of the subroutine is not within the BTB, then there is no way for the BTB to predict the subroutine return branch. Within privileged regions of code it is important to limit branch prediction to only those branches that are confined to a given routine, as fetching beyond the limits of the given routine can alter the state of the processor. Predicting branches outside of the given routine can cause the processor to take actions (e.g., an unexpected fetch request) that are not supported as per the given state of the given subroutine. Such operations can corrupt the state of the processor. Without some form of branch prediction throttling, predictions must be completely prevented within privileged regions of code as to prevent a corrupted/illegal state which would cause the processor to get the wrong answer.

It would be desirable to limit the search area in the BTB to prevent missing a return branch and fetching instructions from a privileged region that can corrupt the state of the processor. Accordingly, there is a need in the art for an approach to perform search area confined branch prediction in a processor.

BRIEF SUMMARY OF THE INVENTION

An exemplary embodiment includes a system for performing search area confined branch prediction in a processor. The system includes a branch target buffer (BTB) to hold branch information for branch prediction, where the branch information includes a branch address. The system also includes search logic for searching the BTB to locate a branch address. The system additionally includes throttle logic to stop searching the BTB in response to reaching a predefined search limit.

Another exemplary embodiment includes a method for performing search area confined branch prediction in a processor. The method includes searching a BTB to locate a branch address, where the BTB holds branch information for branch prediction. The method also includes stopping the searching in response to reaching a predefined search limit.

A further exemplary embodiment includes a system for performing search area confined branch prediction in a processor. The system includes an instruction fetching unit (IFU) to fetch instructions. The system also includes a BTB to hold branch information for branch prediction, where the branch information includes a branch address and a branch type indicator. The system additionally includes search logic for searching the BTB to locate a branch address. The system further includes throttle logic. The throttle logic performing a method including stopping the search logic from searching the BTB in response to a combination of the branch type indicator being set and reaching a predefined search limit. The method additionally includes preventing instruction fetching beyond the predefined search limit.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

An exemplary embodiment of the present invention provides search area confined branch prediction in a processor.

The processor includes a branch target buffer (BTB) for predicting branch target addresses based on branch history information. In an exemplary embodiment, when a special branch type is called, search logic in conjunction with throttle logic limits the length of the search in a BTB to a predefined search limit. Limiting the search length in the BTB prevents inadvertent fetches beyond a termination point of a subroutine that could otherwise lead to adverse effects in the processor. The search limit may be defined as a function of the special branch type with a known maximum subroutine length. Therefore, searching will not cross boundaries into another subroutine to locate a branch. Furthermore, should the subroutine actually call another subroutine outside of the predefined search area, the search constraint can be removed, since the instruction stream is no longer confined to the predefined search area.

Placing constraints on branch prediction prevents the BTB from fetching down paths that are known to be incorrect. For user code, fetching down an incorrect path may reduce performance. However, for privileged code (e.g., internal machine code), which alters the state of the processor, such limitations allow prediction of subroutines for increased performance, and limit future prediction while in the subroutine. Constraining searches for branches within a given subroutine prevents illegal speculative paths from performing operations that can corrupt the state/results of the processor.

Figure 1:
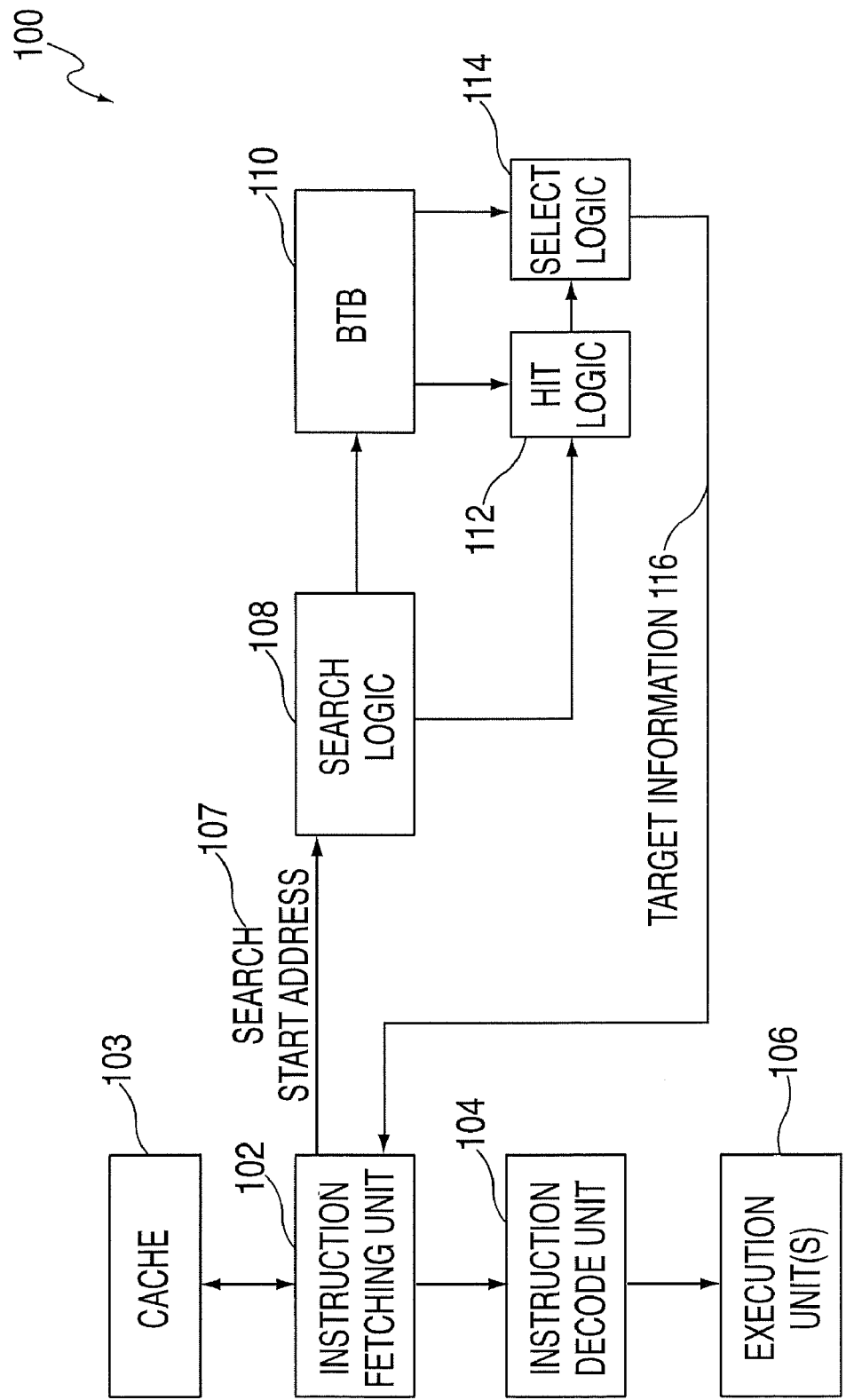
FIG. 1 depicts a block diagram of a system in a processor upon which search area confined branch prediction may be performed in an exemplary embodiment.

Turning now to the drawings in greater detail, it will be seen that in FIG. 1 a block diagram of a system 100 in a processor upon which search area confined branch prediction may be performed is depicted in accordance with an exemplary embodiment. The system 100 includes an instruction fetching unit (IFU) 102 that acquires instructions from cache 103 and passes them to instruction decode unit (IDU) 104. The IDU 104 passes the instructions in an instruction stream to one or more execution units 106. The execution units 106 may support multiple paths for instruction execution, e.g., a superscalar architecture.

To increase efficiency in the system 100, branch prediction may be performed. In support of branch prediction, the IFU 102 sends a search start address 107 to search logic 108. The search logic 108 initiates a search of branch information in BTB 110, such as branch address and target address bits associated with a given branch. Hit logic 112 determines when a branch is located. Upon locating a branch, select logic 114 can return target information 116 to the IFU 102 to support predictive fetching of instructions from the cache 104. While searching for a branch, the IFU 102 may speculatively fetch instructions from the cache 103.

Figure 2:
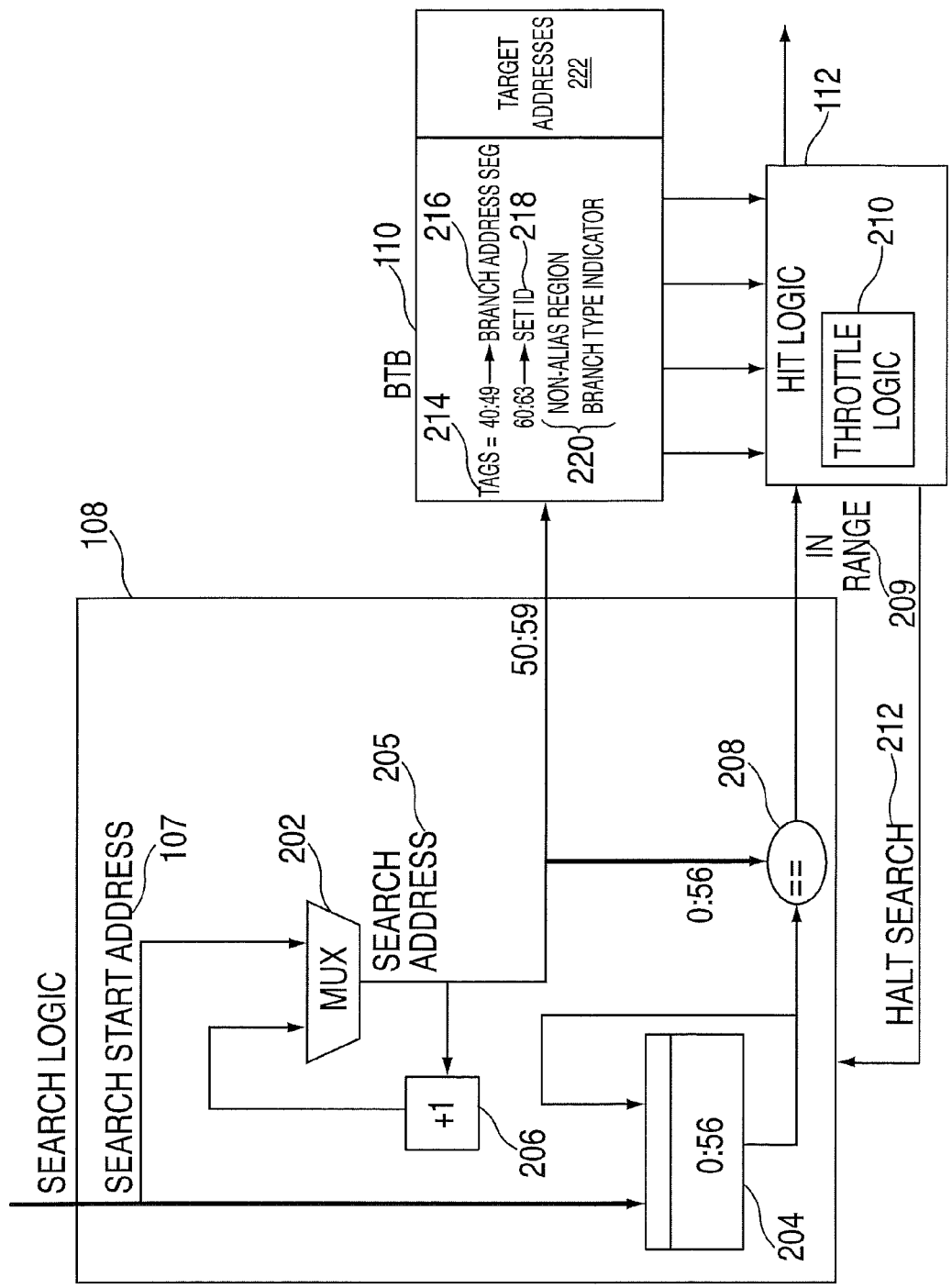
FIG. 2 depicts a block diagram of search logic and hit logic in relation to a BTB in accordance with an exemplary embodiment.

FIG. 2 depicts a block diagram of search logic 108 and hit logic 112 in relation to the BTB 110 in accordance with an exemplary embodiment. The search logic 108 receives the search start address 107 for locating a branch in the BTB 110. The search start address 107 is routed to a multiplexer (mux) 202 and to a latch 204. In the example depicted in FIG. 2, the search start address 107 is a 64-bit address; however, any number of address bits may be utilized within the scope of the invention. The mux 202 selects either the search start address 107 or an incremented feedback value as a search address 205. In an exemplary embodiment, bits 50:59 of the search address 205 are used as an index into the BTB 110. If a branch is not confirmed at the search address 205, the search address 205 is incremented via increment block 206 and feedback through the mux 202. Lower bits of the search address 205, e.g., bits 0:56, are passed to compare block 208 for comparison to output from the latch 204. In an exemplary embodiment, the latch 204 captures bits 0:56 of the search start address 107. Therefore, the compare block 208 indicates that an in-range condition is detected via in-range signal 209 to the hit logic 112. The number of bits selected for the latch 204 and the compare block 208 controls the search range in the BTB 110 for declaring a hit occurred in the hit logic 112. For example, matching the lower 57 bits between the search start address 107 and the search address 205 limits the in-range search to 128 bytes (i.e., bits 57:63).

Throttle logic 210 in the hit logic 112 detects the state of the in-range signal 209 and may issue a halt search 212 command to the search logic 108 when a mismatch occurs at the compare block 208, indicating an out-of-range condition. The throttle logic 210 can further qualify detection of exceeding a search limit as a function of the branch type. A special branch type, such as a branch initiated while running code from a privileged region, may be identified as part of tags 214 in the BTB 110. The tags 214 can be used to determine branch information, as well as branch type. The search address 205 is parsed into bit fields for locating and extracting the tags 214. In an exemplary embodiment, bit positions 50:59 serve as an index into the BTB 110, bit positions 40:49 provide a branch address segment 216, and bit positions 60:63 form a set identifier 218. The set identifier 218 can be used to select between up to the four entries (which have matching branch address segments) using a four-set associative BTB 110. The tags 214 may also include a branch type indicator 220. The branch type indicator 220 can be used to confirm that a non-aliased region of memory is being referenced that is associated with a privileged region of code. For example, when the branch type indicator 220 is set, this can specify that a particular sequence of address bits 0:39 that is not included directly in the BTB 110.

An alias within the BTB 110 can take place for branches which differ on bits 0:39, but match on address bit range 40:63 as per the above example, where bits 0:39 are not included in the BTB 110. The alias can be removed by defining a tag that covers range 0:39 in addition to the above. Another way to remove the alias is to define an architected subset region as to prevent an alias all together. An example of this is using the branch type indicator 220 as a millicode tag bit to identify system control instructions. Millicode includes procedures/routines that can be called by an architected user instruction to perform a complex procedure within a machine/processor using privileged code. Millicode may be allocated to a multi-megabyte privileged region. Upon being installed within the BTB 110, all branches within millicode have the branch type indicator 220 (as a millicode tag bit) set in addition to addresses defined in the tags 214. As long as the addresses defined it the tags 214 are equal to or greater than the defined millicode region, aliases are eliminated.

In an exemplary embodiment, the branch type indicator 220 is associated with a region of memory that can result in state errors in the system 100 of FIG. 1 if accessed incorrectly (e.g., a millicode region). Therefore, the branch type indicator 220 may also be passed to the throttle logic 210, such that the predefined searching limit is enforced in response to the branch type indicator 220 specifying that a special mode is active, e.g., system control instructions, as well as the in-range signal 209. When a branch address is located and confirmed in the BTB 110, a corresponding target address 222 can be selected and returned to the IFU 102 of FIG. 1.

To further summarize, the branch type indicator 220 defines a special branch type whose target is in an address range that does not exhibit aliases within the BTB 110. Furthermore, the special branch type defines how far ahead branch prediction will be allowed to search ahead starting at the target address of the given branch, e.g., search start address 107. This is accomplished by saving off the branch target address of the defined branch as a designated number of bits of the search start address 107 in the latch 204. All sequential searches within the BTB 110 can then be qualified as per the designated number of bits of the search address 205 being compared to the latched bits of the search start address 107, with the upper address bits defining the search range. As long as the designated bits of the search address 205 are a match with the search start address 107, then the search within the BTB 110 is allowed to proceed. Should the address not match as determined using the compare block 208, then any potential BTB 110 hit/match is blocked and searching within the BTB 110 is halted via halt search 212, and not restarted until a pipeline resetting condition. Such conditions can be an interrupt, branch wrong, or a taken branch detected as per the process of decoding instructions by the IDU 104 of FIG. 1.

Figure 3:
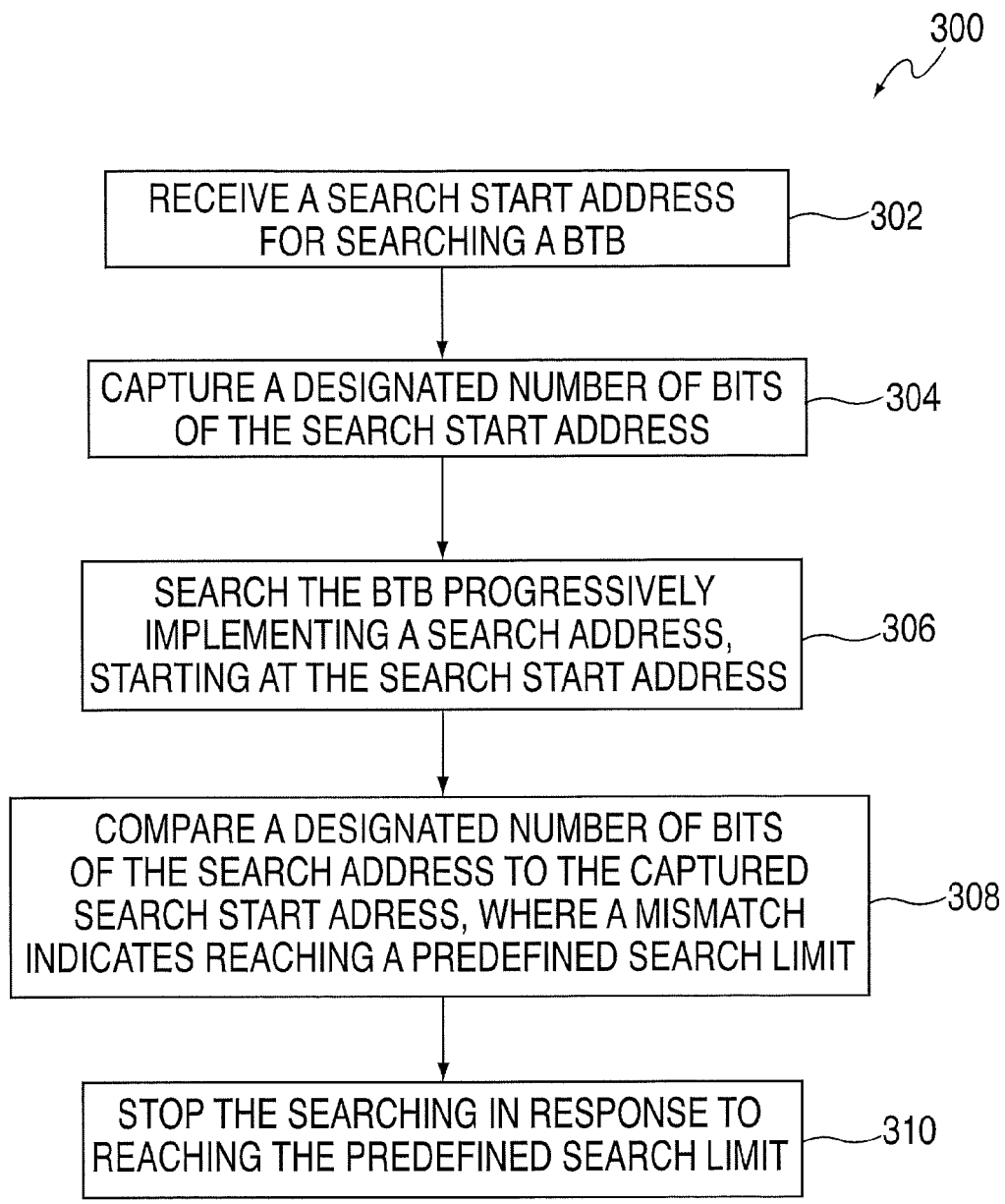
FIG. 3 depicts a process for performing search area confined branch prediction in accordance with an exemplary embodiment.

Turning now to FIG. 3, a process 300 for performing search area confined branch prediction in a processor will now be described in reference to FIGS. 1 and 2, and in accordance with exemplary embodiments. In performing branch prediction logic, the IFU 102 can initiate access of the BTB 110 via the search logic 108. At block 302, the search logic 108 receives search start address 107 for searching the BTB 110.

At block 304, the search logic 108 captures a designated number of bits of the search start address 107 in latch 204. At block 306, the search logic 108 searches the BTB 110 progressively incrementing the search address 205, starting at the search start address 107. The searching may attempt to match a complete branch address or a branch address segment 216 in the BTB 110 with the search address 205 to extract target addresses 222, as well as other information that is not depicted (e.g., branch taken indicator, direction strength, etc.). The set identifier 218 may also be used as part of matching during searching, where the BTB 110 employs a set associative architecture.

At block 308, the search logic 108 compares the designated number of bits of the search address 205 to the captured search start address in the latch 204, where a mismatch indicates reaching a predefined search limit. At block 310, the throttle logic 210 stops the searching in response to reaching the predefined search limit. The throttle logic 210 may also verify that the branch type indicator 220 is set in combination with reaching the predefined search limit (i.e., an out-of-range condition). Stopping the searching prevents the IFU 102 from performing further fetching as a function of a once predicted target (a branch/branch target that will no longer be predicted) that is outside of the predefined search limit. In an exemplary embodiment, searching constraints are removed in response to a branch target address beyond the predefined search limit. The branch type indicator 220 may identify a non-alias region relative to the branch address segment 216 if the width of the BTB 110 is less than the full address.

Technical effects and benefits include limiting a search length in a BTB to prevent fetching beyond a predefined search limit in a privileged region. Throttle logic can halt a search when outside of the predefined search limit while a branch type indicator is set that identifies the privileged region. Benefits may include an ability to use branch prediction while in a privileged region rather than disabling branch prediction, which would reduce processing efficiency. Assigning the predefined search limit to a known subroutine length can prevent inadvertent fetches across subroutine boundaries that can trigger exceptions or alter the state of the processor.

Although the invention has been described in reference to limiting searches to avoid accessing code in a privileged region, the scope of the invention is not so limited. For example, the predefined search limit can be used to avoid accessing a region of memory-mapped registers. The privileged region, need not be millicode or other internal machine instructions, but can be any architected region that may adversely impact performance from an unexpected access. For instance, the privileged region may be an area of memory that could cause an access collision or arbitration delay with respect to another device.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A system for performing search area confined branch prediction in a processor, the system comprising:
   a branch target buffer (BTB) to hold branch information for branch prediction, wherein the branch information includes a branch address;
   search logic for searching the BTB to locate a branch address, wherein the searching is initiated at a search start address and a search address is progressively incremented from the search start address on each pass through the BTB;
   a latch to capture a designated number of address bits of the search start address;
   a compare block to compare the designated number of address bits of the search address to the captured search start address, wherein a mismatch indicates reaching of a predefined search limit; and
   throttle logic to stop searching the BTB in response to reaching the predefined search limit.

2. The system of claim 1 wherein the branch information further comprises a branch type indicator.

3. The system of claim 2 wherein the branch address is an address segment, and the branch type indicator identifies a non-alias region relative to the address segment.

4. The system of claim 2 wherein the throttle logic stops searching the BTB in response to a combination of the branch type indicator being set and reaching the predefined search limit.

5. The system of claim 1 wherein the throttle logic prevents instruction fetching beyond the predefined limit, and further wherein searching constraints are removed in response to a branch target address beyond the predefined limit.

6. A method for performing search area confined branch prediction in a processor, the method comprising:
   searching a branch target buffer (BTB) to locate a branch address, wherein the BTB holds branch information for branch prediction, the searching is initiated at a search start address, and a search address is progressively incremented from the search start address on each pass through the BTB;
   capturing a designated number of address bits of the search start address;

comparing the designated number of address hits of the search address to the captured search start address, wherein a mismatch indicates reaching of a predefined search limit; and stopping the searching in response to reaching the predefined search limit.

7. The method of claim 6 wherein the branch information further comprises a branch type indicator.

8. The method of claim 7 wherein the branch information further comprises an address segment of the branch address, and the branch type indicator identifies a non-alias region relative to the address segment.

9. The method of claim 7 wherein stopping the searching is performed in response to a combination of the branch type indicator being set and reaching the predefined search limit.

10. The method of claim 6 further comprising:
preventing instruction fetching beyond the predefined limit; and
removing searching constraints in response to a branch target address beyond the predefined limit.

11. A system for performing search area confined branch prediction in a processor, the system comprising:
an instruction fetching unit (IFU) to fetch instructions;
a branch target buffer (BTB) to hold branch information for branch prediction, wherein the branch information includes a branch address and a branch type indicator;
search logic for searching the BTB to locate a branch address, wherein the searching is initiated at a search start address, and a search address is progressively incremented from the search start address on each pass through the BTB;
a latch to capture a designated number of address bits of the search start address; and
a compare block to compare the designated number of address bits of the search address to the captured search start address, wherein a mismatch indicates reaching of a predefined search limit; and
throttle logic, the throttle logic performing a method comprising:
stopping the search logic from searching the BTB in response to a combination of the branch type indicator being set and reaching the predefined search limit; and
preventing instruction fetching beyond the predefined search limit.

12. The system of claim 11 wherein the branch address is an address segment, and the branch type indicator identifies a non-alias region relative to the address segment.

13. The system of claim 11 wherein the branch information further comprises a target address, and further wherein the target address is returned to the IFU unless prevented via the throttle logic.

14. The system of claim 11 wherein the branch type indicator is set in response to the branch address being in a privileged region.

* * * * *